Oct. 31, 1933.  J. M. FAY ET AL  1,932,961
SYSTEM OF RAILWAY ELECTRIFICATION
Filed May 26, 1931  4 Sheets-Sheet 1

J. M. Fay
J. J. Drumm
INVENTORS

By Marks & Clerk
Attys.

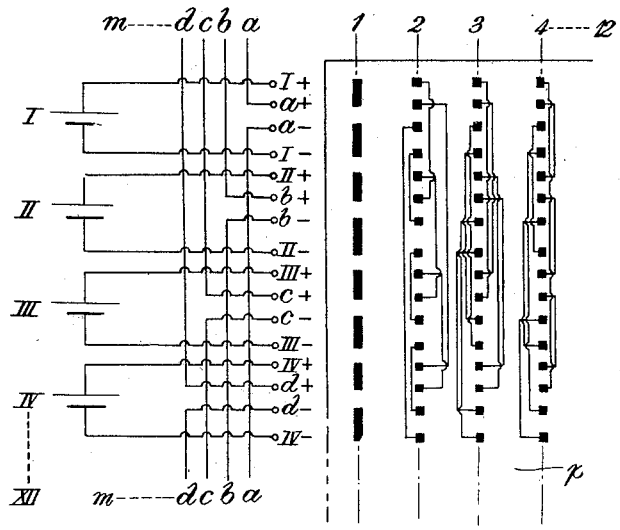
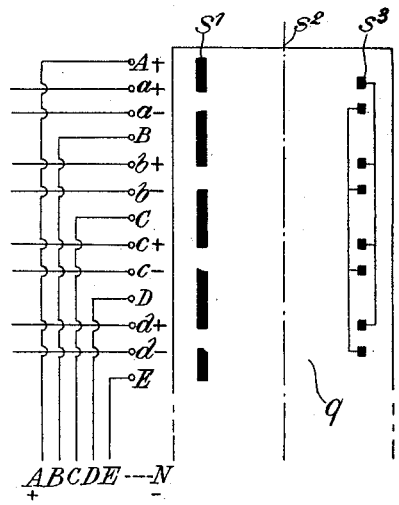
Fig.3.
Fig.4.
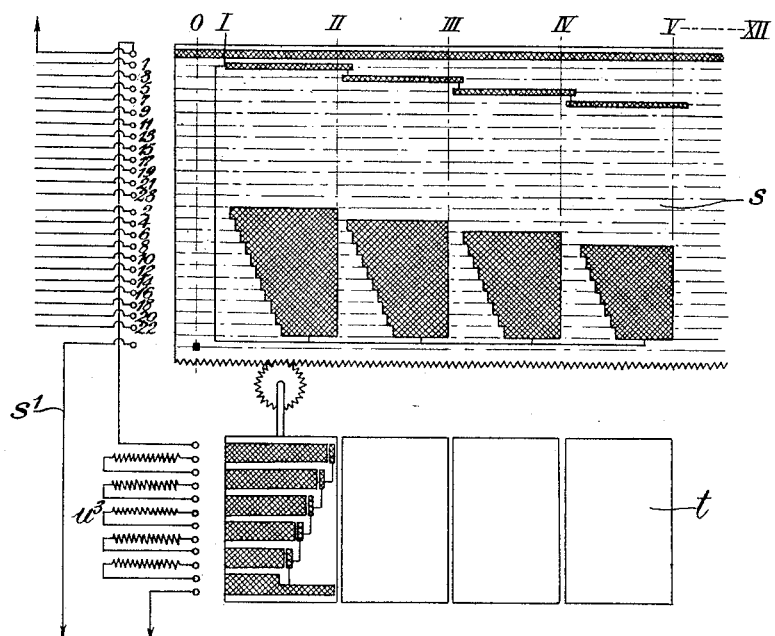
Fig.6.

Oct. 31, 1933.　　　J. M. FAY ET AL　　　1,932,961
SYSTEM OF RAILWAY ELECTRIFICATION
Filed May 26, 1931　　4 Sheets-Sheet 4

J. M. Fay & J.J. Drumm
INVENTORS

By: Marks & Clerk
Attys.

Patented Oct. 31, 1933

1,932,961

UNITED STATES PATENT OFFICE 1,932,961

SYSTEM OF RAILWAY ELECTRIFICATION

James Matthew Fay and James Joseph Drumm, Dublin, Irish Free State, assignors to Drumm Battery Company Limited, Dublin, Irish Free State Application May 26, 1931, Serial No. 540,162, and in Great Britain May 27, 1930

14 Claims. (Cl. 172—291)

This invention relates to battery driven motors with more particular reference to electric traction systems involving the use of battery driven vehicles and has for its object to devise improved means for the control and braking of such vehicles so that not only will a very flexible system of control be obtained but also the power of the battery will be utilized to the best advantage.

Usually, control of voltage and current during starting is effected by using two or more motors which can be arranged in series and parallel groupings and by using resistances designed to keep the current within suitable limits, the cutting-out and cutting-in of resistances and the rearrangement of the motor groupings being effected by the movement of the control handle. Regenerative braking devices when used in connection with continuous contact systems usually require special arrangements for field excitation and special methods of compensation for possible variations in the voltage of the contact system.

In accordance with the present invention we subdivide the battery into sections or units (preferably of equal voltage) and provide in association with the same a controller by which such units can be brought into operation in succession.

The invention also consists in the provision in the battery motor circuit of suitable switches (which may be operated by the controller or otherwise) so that the motor may operate either as a series or as a shunt (or compound) machine as required.

The invention also consists in the provision of means for changing the order in which the various battery sections are brought into operation in order to distribute the duty as evenly as possible between the various sections.

The invention further consists in means for preventing the various sections of the battery from getting out of step by equalizing the voltage of the various sections, and other details and arrangements hereinafter described or indicated.

Figure 1:
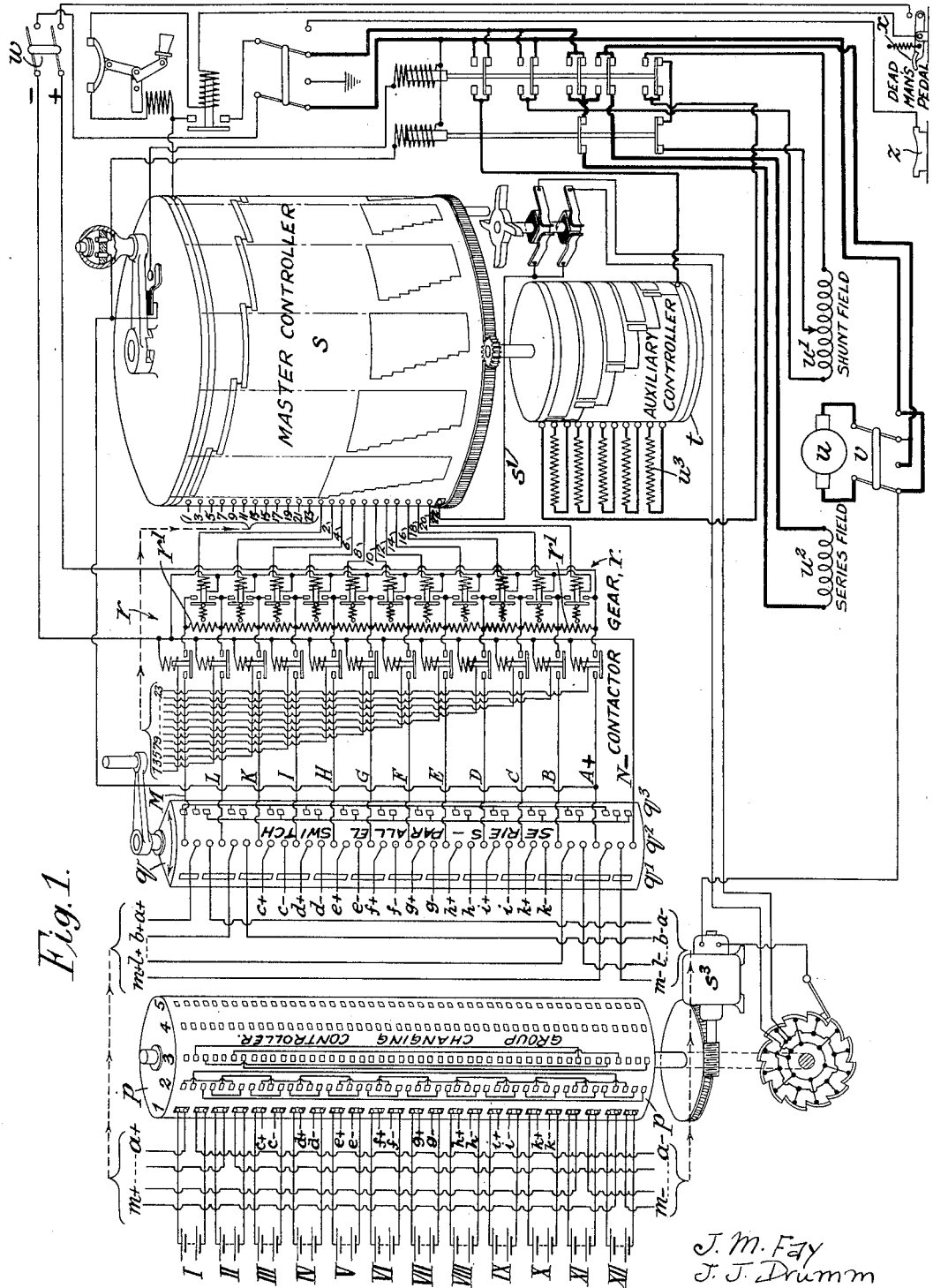
Figure 2:
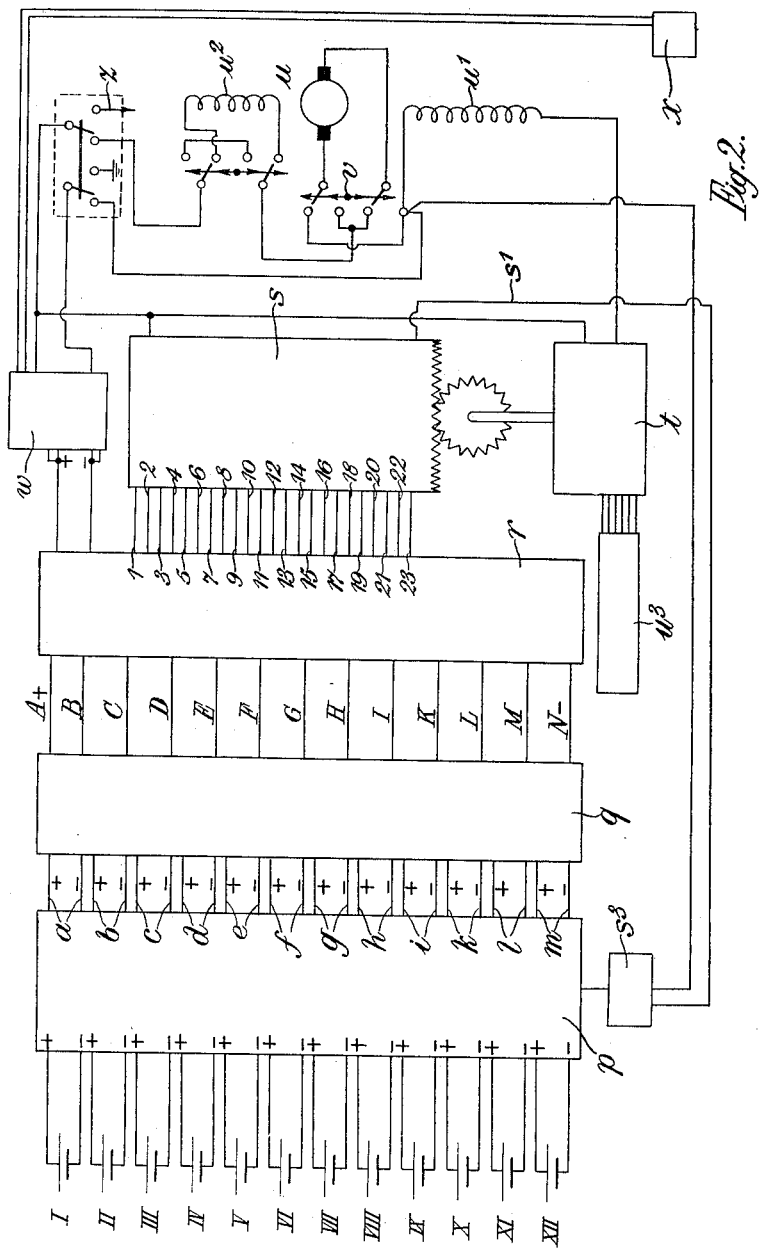
Figure 5:
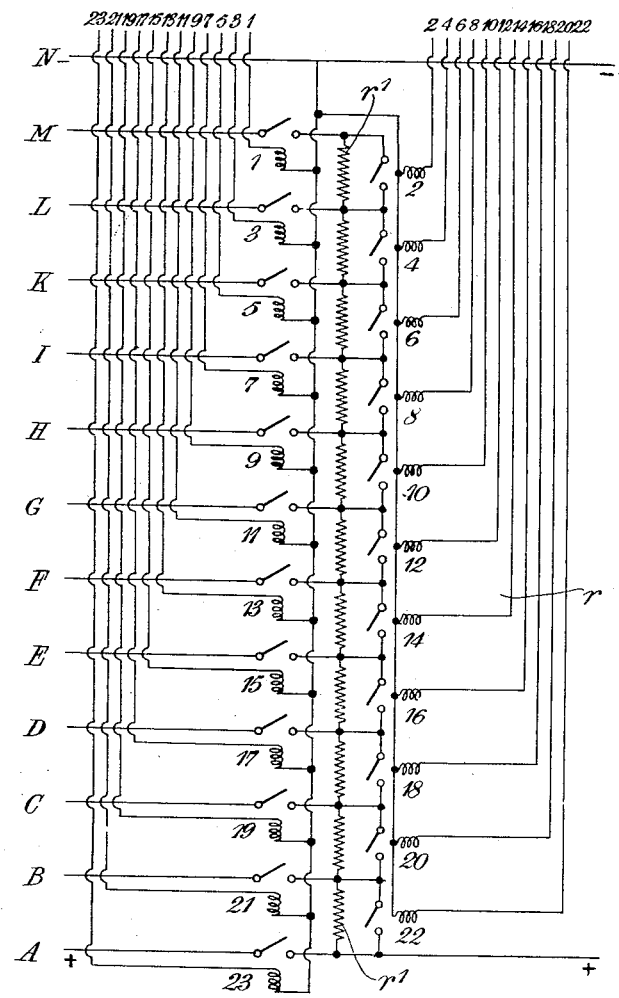

In the accompanying drawings,

Figure 1 is a diagram illustrating a system of railway electrification in accordance with the invention, Figure 2 is a diagram of the general lay-out of battery control system in accordance with the invention, Figure 3 is a detail diagram of a battery group changing controller, Figure 4 is a detail diagram of a manually-operated switch in connection with the group controller, Figure 5 is a diagram of a contactor gear hereinafter referred to, and Figure 6 is a diagram of a master and an auxiliary controller.

In carrying our invention into effect in one convenient manner as, for example, in its application to an electric traction system as illustrated in Figure 1, the energy for the battery is supplied over short sections of the line by means of a third rail $o$ (Figure 1) or overhead conductor connected to the source of supply, the rail or conductor being usually situated at a station and extending, say, for anything from half a mile to three miles at each side of the station, the sections of rail or conductor being spaced apart from one another at intervals of, say, from 10 to 30 miles. In some cases the charging may be effected by a direct connection adapted to be attached to the battery while the train is standing (as, for example, at a terminal station) and the third rail overhead conductor or direct connection would be connected to the source of supply by means of suitable transmission lines $o'$ connected to a power station or in some cases to a small sub-station situated in the locality.

In the case where an alternating current supply is employed some form of rectifier will be necessary for converting the supply to direct current and for this purpose we prefer to use a rectifier $o^2$ as for example of the mercury arc or copper-copper oxide or other type (rather than a motor converter set) on account of the sudden variations in load which it would probably have to carry.

The third rail or other conductor or connection would normally be arranged to be "dead" and may be switched in when required for charging the battery either manually or by automatic control of relays or by a trigger situated at the end of the third rail or overhead conductor section. Such automatic device may be controlled, for example, by a relay which would operate to close the circuit when the current to a small permanently "live" section at either end of the conductor exceeded a certain amount so that as soon as the shoe or trolley of the coach or locomotive should touch the third rail or overhead conductor the current passing in the circuit would close the main switch and so make alive the main third rail or overhead conductor. In Figure 1, $o^3$ indicates the train charging switch operated automatically by a relay energized with current from the traction rail supplied on the operation of triggers $o^4$.

For the purpose of control of the train or like battery, we divide the battery into a number of groups as, for example, for a total battery voltage of 600 volts we might take 12 groups or units each of 50 volts number I to XII in Figures 2 and 3.

The arrangement comprises, in general, a drum type controller (shown at $p$ in Figure 2 and indicated in greater detail in Figure 3) with as many positions as there are groups of cells. Into such controller the two poles of each battery group are led, and from the controller the same number of leads (indicated by the references $a$ to $m$) are brought to the series-parallel switch $q$ (Figures 2 and 4), which will later be described. The drum of this group changing controller $p$ will be automatically rotated through one step every time the main controller returns to its off position or, alternatively, every time the coach or locomotive is brought to rest. This is attained by means of a special contactor $r$ on the "off" position of the main controller through which a suitable motor is actuated to move the drum of the group changing controller through one step. Whenever this movement is completed the supply to the actuating gear is cut off and no further movement of the drum can be made until the main controller is again returned to the "off" position. It will be seen from Figure 3 that the effect of the group changing controller is to change the order in which the various battery sections are brought in so as to distribute the duty as evenly as possible between the various sections.

In order to prevent the various battery units from getting out of step it is proposed to include a manual switch $q$ with three positions marked "series", "off" and "parallel" respectively and indicated at $q^1$, $q^2$ and $q^3$ in Figure 4. This switch would connect the battery units in series in the "series" position and in parallel when in the "parallel" position. The switch might be of the drum type and into it should be led all the leads, $a, b, c \ldots m$ from the group changing controller $p$.

The switch $q$ should generally be in the series position when the batteries are being charged from the external source and also when the battery is supplying power to the motors and an automatic control for this purpose is included in the equipment but the above mentioned switch $q$ should be moved to the parallel position whenever it may be desired to charge in the parallel position in order to help to equalize the voltage of the various sections of the battery.

To provide for smooth acceleration and to reduce the losses in starting, the proposed arrangement may be described generally as follows:—

The starting and acceleration currents will be controlled by means of a contactor gear $r$ (Figures 2 and 5) and a variable shunt field $u'$ separately excited from the battery voltage, leads A, B, C . . . . N connecting the switch $q$ and contactor gear $r$. The contactor gear is operated by the master controller $s$ to which an auxiliary controller $t$ for varying the shunt field is geared.

The master controller is of the drum type and provided with twelve positions to correspond with the twelve sections of the battery and also an "off" position, but for simplicity only four positions of the master controller are shown in Figure 6. The voltage for the motor is built up by progressively changing the tappings on the battery from one group of cells to the whole battery. For smoothness it is essential to prevent interruptions in the supply and it is also necessary to prevent any short circuiting of the battery groups. To prevent interruptions in the battery supply it is arranged to switch on the next tapping before the preceding one has been disconnected and to prevent a short circuit a suitable resistance $r'$ is inserted between the two tappings during the time that the battery section is bridged, thus limiting the short circuit current to a permissible amount. The resistances used to bridge the battery sections are also used to attain smooth acceleration by inserting them momentarily between the battery and the motor according as each new section of the battery is switched in. The motor U is of the series type with a field winding $u^2$ and with a separately excited shunt field $u'$ opposing the series field. The excitation of the shunt field is varied by means of the auxiliary controller $t$ which varies a resistance $u^3$ in series with the shunt field.

The master controller $s$ has a connection $s'$ to the moving gear $s^3$ of the group changing controller $p$.

The auxiliary controller $t$ is also of the drum type and is geared to and operated by the master controller in such a way that it makes one complete revolution when the master controller moves from one position to the next position, that is it makes twelve complete revolutions when the master controller moves through the twelve positions corresponding to the twelve sections or units of the battery. By this means the shunt field, which is in opposition to the series field, is increased, thus reducing the resultant field which increases the angular velocity of the motor armature. When the master controller is moved from one position to the next the auxiliary controller has again reached its zero position and the operation is repeated for each step of the master controller.

Referring to Figures 5 and 6, starting and acceleration are carried out as follows:—

*Master controller on first step*

First—Contactor 1 closes, current flows from positive of battery through all bridging resistances $r'$.

Second—Contactors 2, 4, 6, 8–22 close gradually and cut out resistance from motor circuit.

Third—When contactor 22 is closed auxiliary controller starts to cut out resistance from shunt field thus increasing shunt field and decreasing resultant field with consequent increase in speed.

*Master controller moves to second step*

First—Contactors 2, 4, 6, 8–22 open.
Second—Contactor 3 closes.
Third—Contactor 1 opens.
Fourth—Contactors 4–22 close gradually.
Fifth—When contactor 22 is closed auxiliary controller starts to cut out resistance in shunt field, thus increasing the shunt field and decreasing resultant field with consequent increase in speed as before.

*Master controller moves to third step*

First—Contactors 4–22 open.
Second—Contactor 5 closes.
Third—Contactor 3 opens.
Fourth—Contactors 6–22 close gradually as before.
Fifth—When contactor 22 is closed auxiliary controller starts to cut out resistance from shunt field as before.

The same sequence of operations obtains for the remaining steps of the master controller.

Regenerative braking

The master controller is so designed that regenerative braking may be effected by moving the controller handle from any position reached when motoring towards the "off" position of the controller. One method of achieving this purpose is to arrange that the handle of the master controller is fitted to the drum through a device which allows a certain amount of "backlash" which can be used to energize a contactor which will disconnect the series field from the motor. The series field would always be greater than the shunt field opposing it, and therefore the field of the machine while the series windings are in circuit is always in such a direction as to ensure the driving of the machine as a motor. When, however, the series field is cut out, the direction of the field will be reversed, and since the direction of rotation remains the same, the machine is now converted into a shunt generator and returns current to the battery. It may be necessary, depending upon the allowable currents to be used for regenerative braking, to alter the shunt field ampere turns, but normally the variation of the current in the shunt field by means of the variable resistance should be sufficient for the purpose. The return motion of the master controller towards the "off" position will produce the opposite effects to those described in connection with the acceleration operation of the controller which means that the energy generated by the motion of the train will be returned to the battery at a voltage at any moment slightly in excess of the voltage of the battery sections corresponding to the controller position. As the generated voltage falls due to the slowing down of the train it is controlled by the resistance in the shunt field and by varying the controller position the battery voltage is reduced in exactly the opposite manner to that described in connection with the acceleration operations.

In order to make provision for "coasting" a thumb-controller or other method may be provided on the handle to enable the driver to disconnect the fields of the motor.

To enable the coach or locomotive to move in either direction a switch $v$ is provided which reverses the armature connection and may be manually operated when required; a main switch $w$ is also provided between the battery and the control gear, and this switch is equipped with an overload resistance and is controlled both manually and by a "dead-man's pedal" $x$.

A charge control is also provided (operated, for example, from the signal triggers $o^6$ in Figure 1) which may signal to the driver when approaching a charging section and which will enable him, on receipt of this signal, to move the collecting shoe $z$ (or shoes) into position to receive the charging current. This control may be either mechanical or electrical.

In some cases we may arrange for the separate excitation of the field by one or more sections of the battery or by means of a special battery provided for the purpose.

Having now described our invention what we claim as new and desire to secure by Letters Patent is:—

1. A battery driven motor installation comprising a motor having a shunt winding and a series winding in opposition, a battery divided into sections, a master controller for bringing the battery sections successively into the circuit of the shunt field and an auxiliary controller geared to the master controller to cut out resistance from the shunt field of the motor.

2. A battery driven motor installation according to claim 1, said auxiliary controller being geared to the master controller so as to make one complete revolution as the master controller moves one step.

3. A battery driven motor installation comprising a motor having a shunt winding and a series winding in opposition, a battery divided into sections, a master controller for bringing the battery sections successively into the circuit of the shunt field and means for changing the order in which the various battery sections are brought into operation.

4. A battery driven motor installation comprising a motor having a shunt winding and a series winding in opposition, a battery divided into sections, a master controller for bringing the battery sections successively into the circuit of the shunt field and a group-changing controller associated with the master controller for changing the order in which the various battery sections are brought into operation.

5. A battery driven motor installation according to claim 4, means being associated with the group-changing controller to automatically rotate the same through one step each time the master controller returns to its "off" position.

6. A battery driven motor installation comprising a motor having a shunt winding and a series winding in opposition, a battery divided into sections, a master controller for bringing the battery sections successively into the circuit of the shunt field and means for preventing the various sections of the battery from getting out of step.

7. A battery driven motor installation comprising a motor having a shunt winding and a series winding in opposition, a battery divided into sections, a master controller for bringing the battery sections successively into the circuit of the shunt field and a contactor associated with the tappings of the battery sections such that the next tapping is switched in before the preceding tapping is disconnected.

8. A battery driven motor installation according to claim 7 having means for introducing resistance between adjacent battery tappings during the time that the corresponding battery section is bridged.

9. A battery driven motor installation according to claim 7, said bridging resistance being cut in and out by contactor gear operated by the master controller which successively brings in the battery sections.

10. A battery driven motor installation comprising a motor having a shunt winding and a series winding in opposition, means for varying the shunt field so that the resultant field is varied and means for cutting out the series field and reversing the shunt field for regenerative braking.

11. A battery driven motor installation comprising a motor having a shunt winding and a series winding in opposition, a battery divided into sections, a master controller for bringing the battery sections successively into the circuit of the shunt field and means for cutting out the series field and reversing the shunt field for regenerative braking.

12. A battery driven motor installation comprising a motor having a shunt winding and a series winding in opposition, a battery divided into sections, a master controller for bringing the battery sections successively into the circuit of the shunt field, said series field being always greater than the shunt field but the shunt field being so designed that it will effect necessary weakening of the series field to provide for gradual acceleration without jerking motion according as the voltage on the motor is built up from the battery tappings.

13. A battery driven motor installation comprising a motor having a shunt winding and a series winding in opposition, a battery divided into sections, a master controller for bringing the battery sections successively into the circuit of the shunt field, a thumb controller associated with the master controller for use in coasting and a group-changing controller automatically rotated through one step each time the main controller returns to its "off" position for changing the order in which the battery sections are brought into operation.

14. A battery driven motor installation comprising a motor having a shunt winding and a series winding in opposition, a battery divided into sections, a master controller for bringing the battery sections successively into the circuit of the shunt field, a thumb controller associated with the master controller for use in coasting, a group-changing controller automatically rotated through one step each time the main controller returns to its "off" position for changing the order in which the battery sections are brought into operation and an auxiliary controller geared to the master controller for cutting out resistance from the shunt field of the motor.

JAMES MATTHEW FAY.
JAMES JOSEPH DRUMM.